(12) United States Patent
Lin et al.

(10) Patent No.: US 9,980,290 B2
(45) Date of Patent: May 22, 2018

(54) SYSTEM AND METHOD FOR ADAPTIVE BACK-OFF TIME DETERMINATION

(71) Applicant: Huawei Technologies Co., Ltd., Shenzhen (CN)

(72) Inventors: Meilu Lin, Shenzhen (CN); Jun Zhu, Shanghai (CN); Sheng Sun, Kanata (CA); Yan Xin, Kanata (CA)

(73) Assignee: Huawei Technologies Co., LTD., Shenzhen (CN)

( * ) Notice: Subject to any disclaimer, the term of this patent is extended or adjusted under 35 U.S.C. 154(b) by 165 days.

(21) Appl. No.: 14/988,485

(22) Filed: Jan. 5, 2016

(65) Prior Publication Data

US 2016/0198493 A1    Jul. 7, 2016

Related U.S. Application Data

(60) Provisional application No. 62/100,798, filed on Jan. 7, 2015.

(51) Int. Cl.
*H04W 74/08* (2009.01)

(52) U.S. Cl.
CPC .................. *H04W 74/0816* (2013.01)

(58) Field of Classification Search
CPC .................. H04W 74/08; H04W 74/0816
See application file for complete search history.

(56) References Cited

U.S. PATENT DOCUMENTS

| | | | | |
|---|---|---|---|---|
| 9,325,635 B2* | 4/2016 | Kim | ...................... | H04L 12/413 |
| 9,622,265 B2* | 4/2017 | Sun | .................... | H04W 74/0816 |
| 9,648,613 B2* | 5/2017 | Choi | .................. | H04W 72/0446 |
| 2002/0154653 A1* | 10/2002 | Benveniste | ......... | H04L 12/4013 370/447 |
| 2004/0264423 A1* | 12/2004 | Ginzburg | .......... | H04W 74/0816 370/338 |
| 2005/0128977 A1* | 6/2005 | Kwak | .................... | H04W 28/14 370/329 |
| 2006/0215686 A1* | 9/2006 | Takeuchi | .............. | H04W 28/18 370/445 |
| 2006/0245447 A1 | 11/2006 | Chou et al. | | |

(Continued)

OTHER PUBLICATIONS

IEEE, "IEEE Standard for Information Technology—Telecommunications and Information Exchange Between Systems—Local and Metropolitan Area Networks—Specific Requirements, Part 11: Wireless LAN Medium Access Control (MAC) andPhysical Layer (PHY) Specifications," IEEE Draft P802.11-REVmb/D12, Nov. 2011, 2910 pages.

(Continued)

*Primary Examiner* — Tri H Phan
(74) *Attorney, Agent, or Firm* — Slater Matsil, LLP (57) ABSTRACT

In accordance with an embodiment a method for performing carrier sense multiple access with collision avoidance (CSMA-CA) by a station in a wireless communications network includes determining, in accordance with transmission information related to previous transmission attempts, a rate of success for each window section of a plurality of window sections, selecting a window section in accordance with at least the rate of success for each of the window sections and at least one predetermined threshold, and transmitting data after a back-off delay selected from within the selected window section.

21 Claims, 5 Drawing Sheets

(56) References Cited

U.S. PATENT DOCUMENTS

| | | | |
|---|---|---|---|
| 2009/0310620 A1* | 12/2009 | Yoshizawa | H04L 12/413 370/461 |
| 2011/0182178 A1* | 7/2011 | Du | H04L 12/413 370/230 |
| 2013/0070781 A1 | 3/2013 | Vedantham et al. | |
| 2013/0089036 A1 | 4/2013 | Cho et al. | |
| 2013/0188653 A1* | 7/2013 | Kim | H04L 12/413 370/442 |
| 2014/0198642 A1* | 7/2014 | Barriac | H04W 74/08 370/230 |
| 2014/0307658 A1* | 10/2014 | Vedantham | H04W 74/0816 370/329 |
| 2014/0376532 A1 | 12/2014 | Sun et al. | |
| 2015/0230245 A1* | 8/2015 | Choi | H04W 74/0816 370/329 |
| 2016/0088513 A1* | 3/2016 | Huang | H04W 74/0816 370/328 |
| 2016/0088658 A1* | 3/2016 | Padden | H04W 74/0816 370/338 |

OTHER PUBLICATIONS

International Search Report received in Application No. PCT/US14/43257, dated Oct. 28, 2014, 8 pages.

\* cited by examiner

SYSTEM AND METHOD FOR ADAPTIVE BACK-OFF TIME DETERMINATION

This application claims the benefit of U.S. Provisional Application No. 62/100,798, filed on Jan. 7, 2015, titled "System and Method for a CSMA-CA Half Window Scheme," which application is hereby incorporated by reference.

TECHNICAL FIELD

The present invention relates to wireless communications, and, in particular embodiments, to a system and method for a carrier sense multiple access with collision avoidance (CSMA-CA) window section selection procedure.

BACKGROUND

In the CSMA-CA procedure for IEEE 802.11 (WiFi) communications, a communication device (CD) that experiences a transmission collision delays its access to a medium for retransmitting data by a determined back-off time. The CD can determine that a collision has occurred when the CD performs the CCA and detects the medium is busy, indicating that another transmission occurred at the same time, interfering with the CD transmission. The back-off time is calculated by selecting a random number from a predetermined window size. A Markov Chain analysis of throughput using this formula for calculating the back-off time reveals that the peak throughput can be sustained at about 70% of the overall throughput in normal network conditions (acceptable density of CDs or transmissions). The back-off time, or contention window, is increased based on previous failure of a transmission or according to detection of collisions with other CD transmissions, for example, by doubling the back off time and retransmitting the data using the new back off time. For successive transmission failures, the back off time is successively doubled as long as collisions continue to occur. The doubling stops when the back-off time reaches a maximum back-off time CWmax. An improved procedure for determining the back-off time that results in fewer collisions between CDs and higher overall throughput is favorable for high wireless traffic situations, such as for high density of CDs in an area or high transmission concentration in an area that may cause a large number of collisions in random access transmissions.

SUMMARY OF THE INVENTION

In accordance with an embodiment a method for performing carrier sense multiple access with collision avoidance (CSMA-CA) by a station in a wireless communications network includes determining, in accordance with transmission information related to previous transmission attempts, a rate of success for each window section of a plurality of window sections, selecting a window section in accordance with at least the rate of success for each of the window sections and at least one predetermined threshold, and transmitting data after a back-off delay selected from within the selected window section.

An embodiment communications device supporting carrier sense multiple access with collision avoidance (CSMA-CA) includes at least one processor; and a non-transitory computer readable storage medium connected to the at least one processor and storing programming for execution by the at least one processor. The programming includes instructions to determine, in accordance with transmission information regarding previous attempts of accessing a medium designated for transmitting data, a rate of success and a rate of failure for each window section of a plurality of window sections, select, from the plurality of window sections, a window section in accordance with at least the rate of success and failure for each of the window sections and at least one predetermined threshold, and transmit data after a back-off delay determined according to the selected window section.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
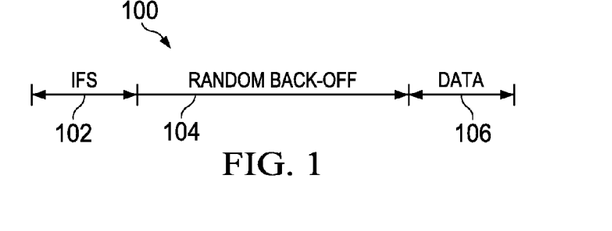
FIG. 1 illustrates a clear channel assessment (CCA) procedure.

FIG. 1 shows a current clear channel assessment (CCA) procedure 100 for IEEE 802.11 for accessing the medium by a communication device (CD). It should be understood that the CCA procedure is not limited to 802.11 network access, and may be also be applied to a Bluetooth network, or any other communications network that allows unscheduled or opportunistic access. As used herein, the CD can be any wireless device, such as a WiFi access point (AP) or a WiFi station (STA) that accesses a WiFi network via a WiFi AP. Examples of CDs include smartphones, computer tablets, laptop computers, desktop computers, routers, or other devices that communicate using 802.11, Bluetooth, or other unscheduled communications signaling. The CDs may also include any devices that act as APs to allow other CDs to access a wireless network, e.g., a WiFi network, Bluetooth network, or any other communications network. Before accessing the medium to send data, a CD waits an inter-frame space (IFS) time 102. If the CD detects a collision during transmission, the CD delays its data transmission 106 by a back-off time 104 or contention window (CW) after the IFS time 102 in an attempt to mitigate collisions with another transmission (from another CD).

Figure 2:
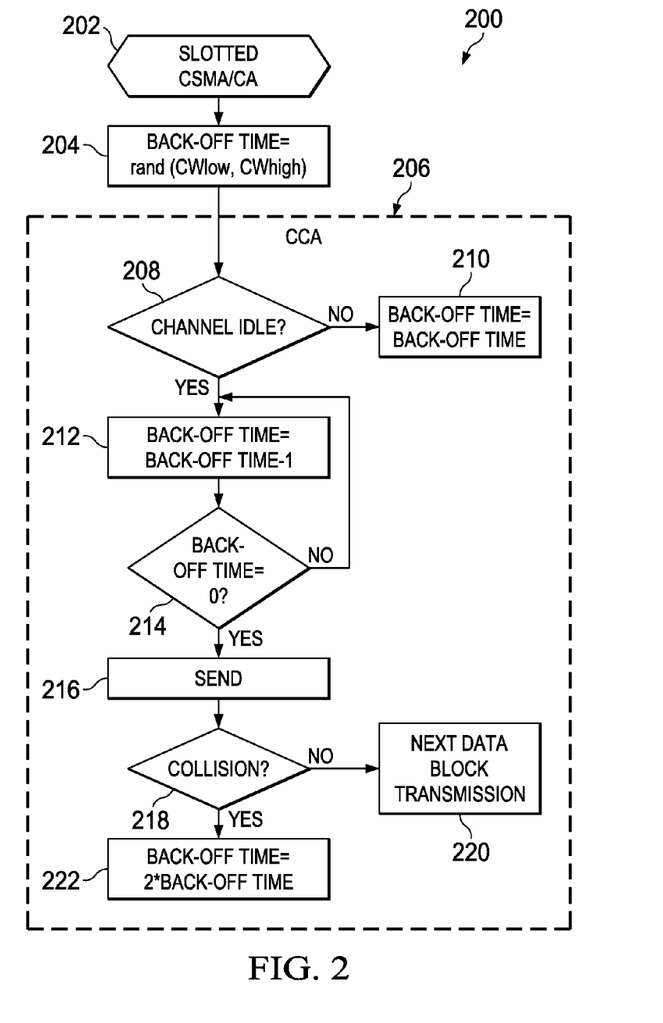
FIG. 2 illustrates a carrier sense multiple access with collision avoidance (CSMA-CA) procedure.

FIG. 2 illustrates a carrier sense multiple access with collision avoidance (CSMA-CA) procedure 200. In the CSMA-CA procedure, a slotted CSMA-CA process is started in block 202. In block 204, the back-off time for accessing the medium is calculated (by a CD) by randomly selecting a back off time or CW size that is an integer number between a predefined window size lower bound (CWlow) and a predefined window size upper bound (CWhigh). In some embodiments, CWlow may be zero. The back-off time or CW size is multiplied by a predefined (minimum) time interval, and is used in a clear channel assessment procedure in block 206. After transmission of the data, the CD checks for an acknowledgement or response to the transmission, with the lack of a response indicating a collision. When a collision is detected, the back-off time is increased, for example by doubling the back-off time. The data is retransmitted after a delay corresponding to the increased back-off time. For successive transmission failures or collisions, the back off time is successively doubled as long as collisions continue to occur. The doubling stops when the back-off time reaches a maximum back-off time CWmax. When no collision occurs, the window size is reset to its initial value, or to a default maximum CWmin.

In some embodiments, CD uses the following equation to calculate the back-off time: Back-off Time=Random(CWlow, CWhigh)×Slot time. Random( ) is a random number generator function, and Slot time is a predefined time period variable. The algorithm can be expressed as follows:

---

Choose random waiting time between [CWlow, CWhigh] (block 204);
Perform CCA (block 206):
    if (Idle) (block 208)
        back-off time=back-off time-1 (block 208);
        if (back-off time=0) (block 214), send (block 214);
        if (collision) (block 218)
            back-off time=2 × back-off time (block 222);
        else
            next data block transmission (block 220);
    else back-off time=back-off time (block 210).

---

Thus, a back-off time is determined in block 204 using CWlow and CWhigh as the initial boundaries for a random number generator. The CCA process is performed in block 206 using the determined back-off time. In block 208, the CD checks to see of the transmission channel is idle. If the channel is not idle, the back-off time is maintained at a constant value in block 210. If the channel is idle, the CD delays data transmission by counting down the back-off time in block 212 until the CD determines that the back-off time has been decremented to 0 in block 214. When the back-off time reaches 0, the data is sent in block 216. The CD determines, in block 218, if a collision occurred during the sending in block 216. If a collision occurs, the back-off time is increased in block 222, for example by doubling the back-off time. In block 220, if a collision does not occur, the CCA is complete, and the CD is ready for the next data block transmission.

Figure 3A:
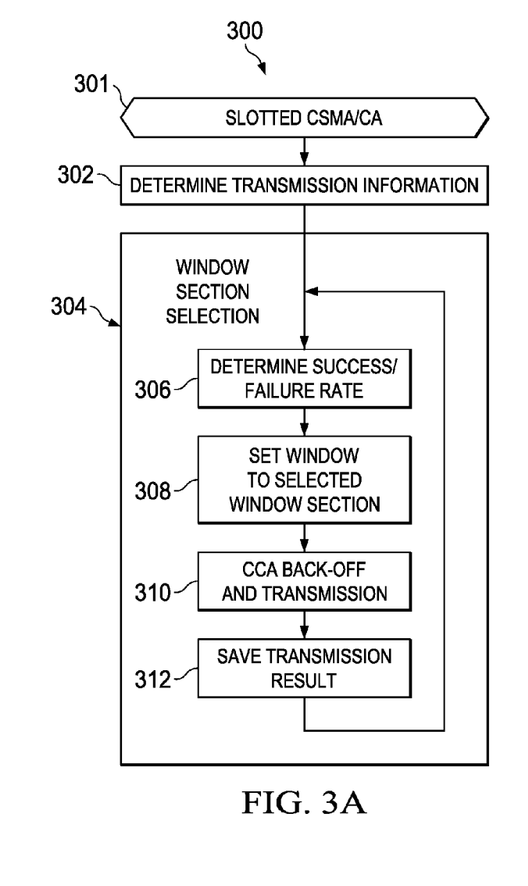
FIG. 3A illustrates a flowchart of an adaptive back-off time determination method according to some embodiments.

FIG. 3A illustrates a window section selection procedure 300 according to some embodiments. The window section procedure 300 may be a CSMA-CA window selection procedure for 802.11 networks or other suitable wireless networks that could benefit from such a procedure. In some embodiments, the window is separated into two half windows, and a rate of success for each half window is determined. In other embodiments, the window is split into more than two window sections. Although the present disclosure may make reference to "half windows", it should be understood that the disclosed embodiments are equally applicable to implementations having more than two window sections or window sections of different sizes. In the window section procedure 300, the CD performs the back-off time calculation by using a window section selected based on the success rate for previous transmissions. The term "success" should be understood to mean any criterion that carries success rate information. Therefore, selecting a window section based on the success rate for previous transmissions may include using the failure rate for previous transmissions to select the window section for back-off time calculation. The rate of failure can be determined, calculated or inferred from the rate of success, and vice versa. Therefore, it should be understood that the window section selection may be made according to the rate of failure without deviating from the principles disclosed herein. Thus, references to the rate of success should be understood to encompass the rate of failure.

The success rate is used to select a portion of the window representing the range of possible CW values as a window section. The window section is selected on the CD's history of collisions for previous medium access attempts in that window section, and defines the bounds of the back-off time. In some embodiments, the range of possible back-off time values is a window that is split into two half windows or window sections of equal size. In other embodiments, the window is split into more than two window sections. The window sections may have different sizes. In the window section selection procedure 300, the CD evaluates a decision tree based on the occurrence or avoidance of a collision in previous transmission attempts.

In the window section selection procedure 300, the CD makes use of the success/failure information for accessing the medium to provide bounds or a specific range for the random number generator when determining the back-off time. The selection of a half window based on the number of successes in previous windows and on predetermined thresholds permits efficient computation of the likelihood of a collision in a particular half window, and rapid selection of the appropriate back-off time, while mitigating the need for computationally costly or memory intensive calculations. For example, using a half window selection procedure based on collision information from previous transmissions mitigates the need for logarithm calculations or tables that require large amounts of computing or memory resources. Thus, such a contention window selection procedure can be particularly advantageous for lower powered, smaller, and less costly platforms.

A slotted CSMA-CA process is started in block 301. The CD gathers transmission information in block 322. During training, shown in block 322, a CD generates transmission information to evaluate success probability of each window section. During a window section selection, shown in block 304, the CD selects the window section for use as the bounds for generating the random number for back-off time based on the transmission information determined in block 322. In some embodiments, the transmission information is determined from transmissions made after a default back-off time selection.

In other embodiments, the transmission information is populated with default data, predetermined data, dummy data, stored data, or the like. In the window section procedure 300, the CD creates a decision tree for the two window sections. The decision tree is a state function running in the CD that evaluates the occurrences of collisions in transmission attempts during each window section based on the transmission information. The CD uses the decision tree to determine which window section to choose.

In the window section selection of block 304, the CD uses the transmission information based on the rate of success for previous transmissions to select the window section. In block 306, the rate of success is determined from the transmission information and a decision tree is generated for selecting a window section. Embodiments of the decision tree are described in greater detail below, and permit the CD to analyze the rate of success for transmissions in the early and late window sections. The decision tree splits the window into two window sections. The CD chooses one of the window sections from which to select a random number for the back-off time according to the decision tree. The CD determines the window section rate of success for each window section from the transmission information. In some embodiments, the decision tree selects a window section based on the rate of success in previous transmissions. The process can be repeated by the CD, e.g., at each access of the medium.

The two window sections are an early window section (CWlow≤x≤CWmid) and a late window section (CWmid≤x≤CWhigh), where CWmid=(CWhigh−CWlow)/2, and x is the number chosen from one of the two window sections. For example, window with a CWlow of 15 and a CWhigh of 255 has a CWmid of 135. The window may alternatively be divided into any greater number of window sections. Additionally, the window sections may alternatively be unequal in size.

In block 308, the bounds of the random number generator used to generate the back-off time are set according to the selected window section. In block 310, CCA back-off and transmission is performed using the selected window section as the bounds for generating the back-off time. In some embodiments, the random function is used to generate a random back-off time. In such embodiments, the boundaries for the random number generator are set to the boundaries of the selected window section. For example, where the early window section is selected, the random number generator of block 204 will generate a back-off time between 15 and 135. Similarly, where the late window section is selected the random number generator of block 204 will generate a back-off time between 135 and 255. The back-off time generated based on the selected window section is used in a CCA and transmission process such as that described above with respect to FIG. 2. In such a CCA process, the CD saves the transmission result in block 312 as a new transmission information entry. Thus, the transmission information is updated with the most recent transmission results. In the window section selection, the CD recalculates the rate of success for the window sections in subsequent iterations of the window section selection. In some embodiments, a fixed number of transmission information entries are retained, with new entries replacing the oldest entries.

Figure 3B:
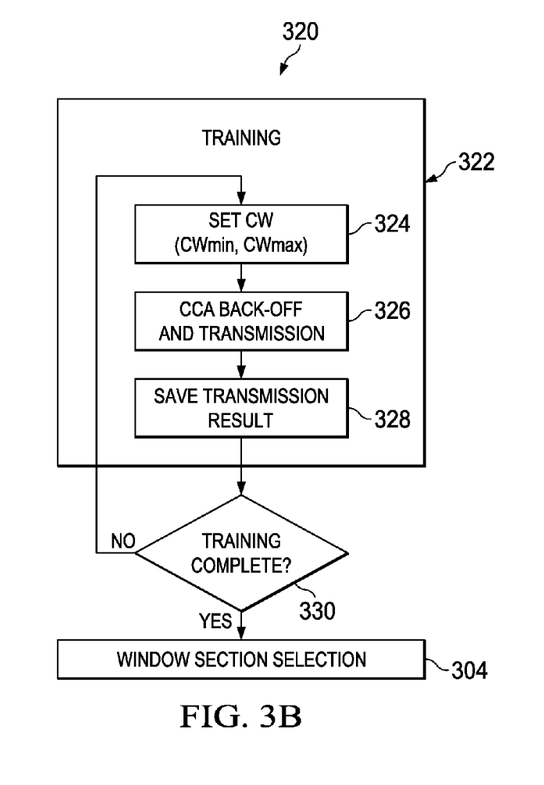
FIG. 3B illustrates a training procedure for determining transmission information.

FIG. 3B illustrates a training procedure for determining transmission information. The determination of transmission information in block 302 (FIG. 3A) is performed, in some embodiments, by repetition of the training in block 322 until a predetermined number of rounds is reached and the training is completed. During the training of block 322, the CD performs transmissions using a default window size, and in some embodiments, increases the window size when collisions are detected. In block 324, an initial back-off time or CW size between CWlow and CWhigh is determined. In some embodiments, the default window size is determined by a random number generator, as described above with respect to block 204. In block 326, a CCA back-off and transmission process is performed. In some embodiments, the CCA process described above with respect to FIG. 2 is performed. The CCA back-off and transmission of block 326 includes a determination of whether the transmission resulted in a collision. The transmission result is saved in block 328 as the transmission information.

In some embodiments, the transmission information includes the back-off times of an attempted transmission, and the result of the attempted transmission. In other embodiments, an indicator, such as one or more bits, is set to indicate the window section in which the attempted transmission was made, along with the result of the attempted transmission. The transmission information is represented herein as the set S={(r1,st1); (r2,st2); (r3,st3); . . . (rn,stn)}, where r is the random generated real number used for the back-off time or is an indicator representing a half window or window section. The variable st denotes the Boolean state (success or failure) for the transmission. In some embodiments, the transmission result is saved in working memory, RAM, a hard drive, EEPROM, or the like.

The CD determines whether the training is complete in block 330, and if not, the CD repeats the training in block 322. In some embodiments, the CD tracks the number of iterations performed in the training using a counter, by tracking the number of saved transmission results, or the like. For example, a predetermined count may be set to 15, or any other number, so that the training is repeated until a counter reaches the predetermined count indicating that the training has run 15 (or other selected number) times, or until the CD has saved the predetermined number of transmission results.

Figure 4A:
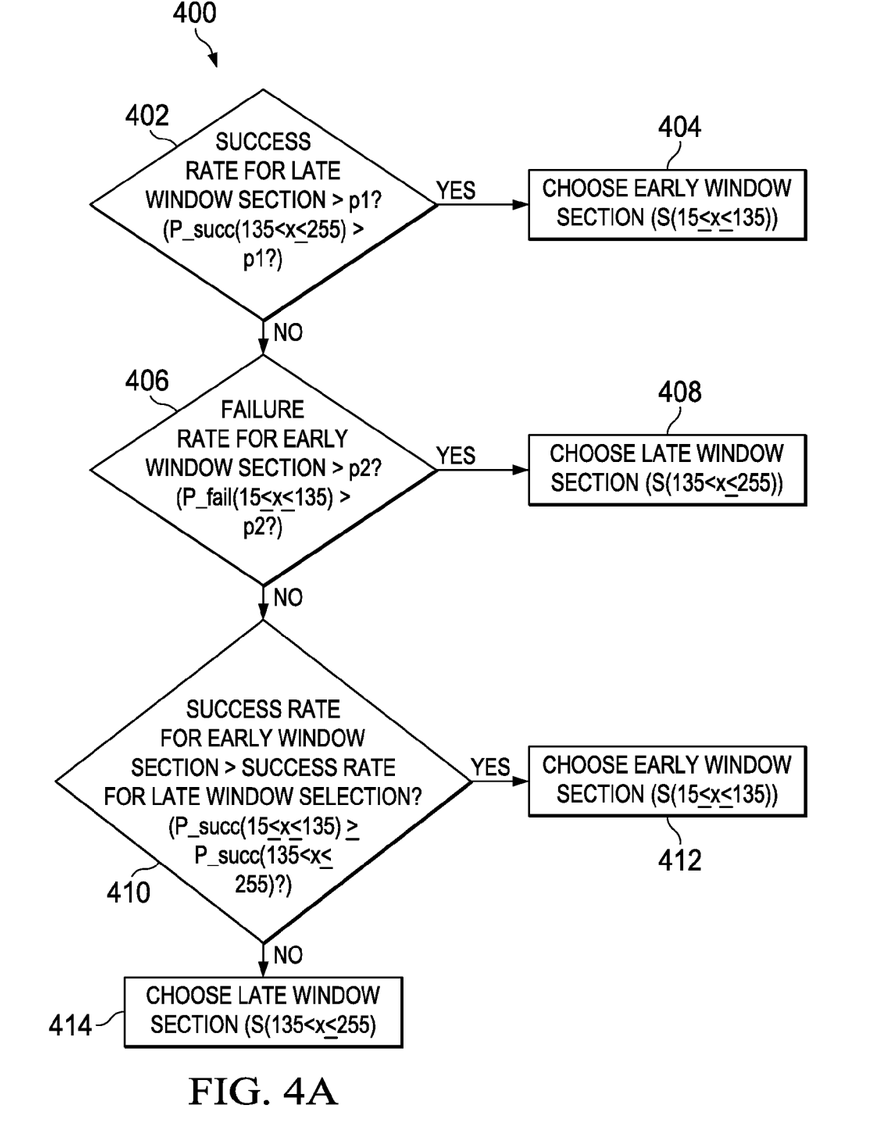
FIGS. 4A and 4B illustrates a window section selection procedure decision trees according to some embodiments.

FIG. 4A illustrates a window section selection procedure decision tree 400 based on the success and/or failure rate of previous transmission according to some embodiments. A CD uses the decision tree 400 to implement a threshold based decision that is based on the rates of success and/or failure for the window sections, and on one or more predetermined thresholds for the rates of success and/or failure. The CD uses the collected transmission information set, S{(r, st)}. In embodiments where the transmission information is historical information collected from previous transmissions, r is the randomly generated number representing the back-off time, and st denotes a Boolean state that is either success (denoted as +) or failure (denoted as −). In one example using historical transmission information, S is {(199,−); (83,+); (156,+); (136,−); (251,+); (177,+); (103,+); (206,−); (58,−); (130,+); (226,−); (62,+); (152,+); (242,+)}. The rate of success of each window section is determined from the transmission information S. The transmission information is grouped into two subsets, representing the early and late window sections. For example, where CWlow=15 and CWhigh=255, the early window is associated with the set of data for back-off times between 15 and 135 (S [15≤x≤135]) and the late window section is associated with the set of data for back-off times between 135 and 255 (S [135≤x≤255]).

In an embodiment, the rates of success and failure are calculated for each window section according to the associated subsets of transmission information. In the above example, the transmission data for the early window section is [6+, 2−], representing 6 successes and 2 failures for back-off times between 15 and 135. Similarly, the associated transmission data for the late window section is [3+, 3−], representing 3 successes and 3 failures for back-off times between 135 and 255. For the late window section, the transmission information gives the set S(135<x≤255)=[3+, 3-]. The rate of success for the late window section is given by: P_succ(135<x≤255)=3/6, and the rate of failure for the early window section is given by: P_fail(135<x≤255)=3/6. The decision tree based uses predetermined thresholds p1 and p2 for comparing the rate of success or failure. In some embodiments, p1 and p2 are varied based on different scenarios.

In block 402, the rate of success for the late window section is compared to a first threshold p1. If the rate of success for the late window section is greater than p1, then the early window section is selected in block 404. Transmitting within the early window section is preferable, where possible, because transmissions in the early window section take place with less delay than transmissions in the late window section. Thus, if transmitting within the late window section is generally successful, there is a greater chance that transmissions in the early window section will also be successful.

The rate of failure for the early window section is evaluated in block 406. If the rate of failure is greater than a second threshold p2, then the late window section is chosen in block 408. As discussed above, in some embodiments, the rate of success is used in place of the rate of failure because the rate of success and the rate of failure are related. Thus, if the rate of success is less than or equal to a third threshold that is 1−p2, the late window section is chosen. Although transmitting in the early window section is preferable to transmitting in the late window section, if early window section has a high rate of failure, then transmitting in the late window section may be more advantageous.

The rates of success for the early window section and for the late window section are compared in block 410. If the rate of success for the early window section is greater than, or equal to, the rate of success for the late window section, then the early window section is chosen in block 412, otherwise the late window section is chosen in block 414. Thus, if the rates of success for the late window section and the rate of failure for the early window section are both lower than the respective thresholds, the window section with the greater rate of success is chosen. The relative rates of success for the window sections tend to indicate the recent traffic rates within the window sections and the likelihood of success in succeeding transmissions. This is because using the results of the most recent transmissions to determine the rates of success gives an indication of the most recent usage rate of the early and late window sections.

Referring again to the above example of historical transmission information gathered during the training phase, and where p1=p2=80%, the decision tree is evaluated as follows:

--- if {P_succ(135<x≤255) > p1} (block 402),
    choose S(15≤x≤135) (block 404)
else if {P_fail(15≤x≤135) > p2} (block 406),
    choose S(135<x≤255) (block 408)
    else {if {P_succ(15≤x≤135) ≥ P_succ(135<x≤255)} (block 410),
        choose S(15≤x≤135) (block 412),
        else choose S(135<x≤255) (block 414)

---

In this example, because P_succ(135<x≤255) (3/6, or 50%) is not greater than p1 (80%) and P_fail(15≤x≤135) (2/8, or 25%) is not greater than p2 (80%), P_succ(15≤x≤135) is compared to P_succ(135<x≤255). P_succ(15≤x≤135) (75%) is greater than or equal to P_succ(135<x≤255) (3/6, or 50%). Therefore the early window section S(15≤x≤135) is chosen for generation of the back-off time.

Figure 4B:
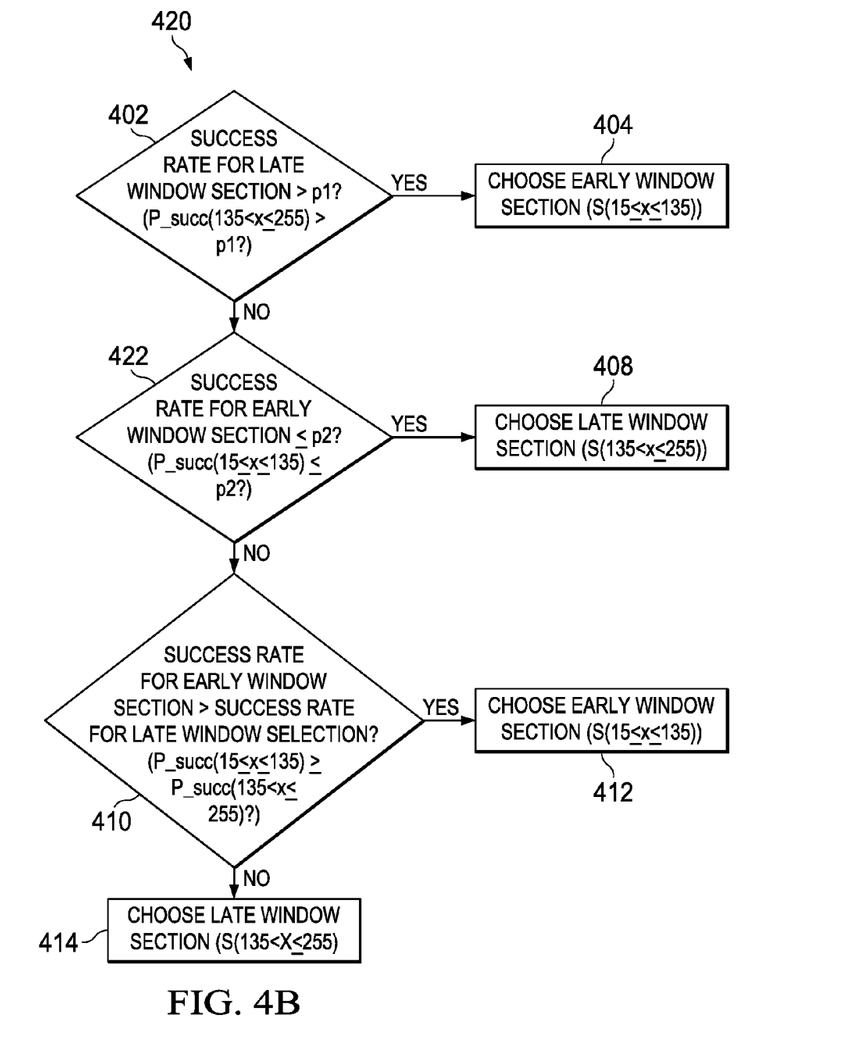

FIG. 4B illustrates a window section selection procedure decision tree 420 based on the success rate of previous transmissions according to some embodiments. A CD uses the decision tree 420 to implement a threshold based decision that is based on the rates of success for the window sections, and on one or more predetermined thresholds for the rates of success. Because the rate of success can mean any criterion that carries success rate information, such as the rate of failure, the window selection procedure decision tree 420 may use the rates of success for the window sections. Therefore, selecting a window section can, in some embodiments, use success rate information for previous transmissions instead of the failure rate information for back-off time calculation.

Similar to the procedure described above for selecting a window section based on the rates of success and/or failure for the window sections, the rates of success are calculated for each window section according to the associated subsets of transmission information. In block 402, the rate of success for the late window section is compared to a first threshold p1. If the rate of success for the late window section is greater than p1, then the early window section is selected in block 404. The rate of success for the early window is evaluated in block 422. If the rate of success is less than or equal to a second threshold p2, then the late window section is chosen in block 408. The rates of success for the early window section and for the late window section are compared in block 410. If the rate of success for the early window section is greater than, or equal to, the rate of success for the late window section, then the early window section is chosen in block 412, otherwise the late window section is chosen in block 414. Thus, if the rate of success for the late window section is greater than p1, and the rate of success for the early window section is greater or equal to than p2, the window section with the greater rate of success is chosen.

In such an embodiment, the decision tree is evaluated as follows:

--- if {P_succ(135<x≤255) > p1} (block 402),
    choose S(15≤x≤135) (block 404)
else if {P_succ(15≤x≤135) ≤ p2} (block 422),
    choose S(135<x≤255) (block 408)
    else {if {P_succ(15≤x≤135) ≥ P_succ(135<x≤255)} (block 410),
        choose S(15≤x≤135) (block 412),
        else choose S(135<x≤255) (block 414)

---

Figure 5:
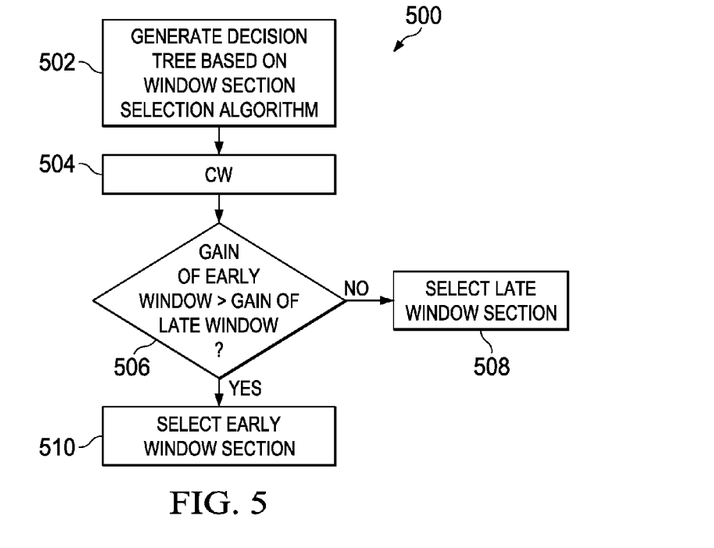
FIG. 5 illustrates a gain based window section selection procedure decision tree.

The decision trees based on the rate of success or failure described above provides a system for determining a window section based on simple calculations that are easily performed in low cost hardware compared to, for example, window section determination systems that calculate the gain of the different window sections. For example, FIG. 5 illustrates a gain based window section selection procedure decision tree 500. In block 502, the CD builds the decision tree based on the obtained gain. In block 504, the gain for the previous transmissions is determined by calculating the gain of each window section using the formula:

$$\text{gain}(S, A) = \text{Entropy}(S) - \Sigma_{v=\text{Value}(A)} \frac{|S_v|}{|S|} \text{Entropy}(S_v).$$

In block 506, the gains of the early window section and late window section are compared. If the gain of the early window section is greater than that of the late window section, the random number generator bounds are set to the early window section in block 510. If the gain of the late window section is greater than that of the early window section, the random number generator bounds are set to the late window section in block 508.

Figure 6:
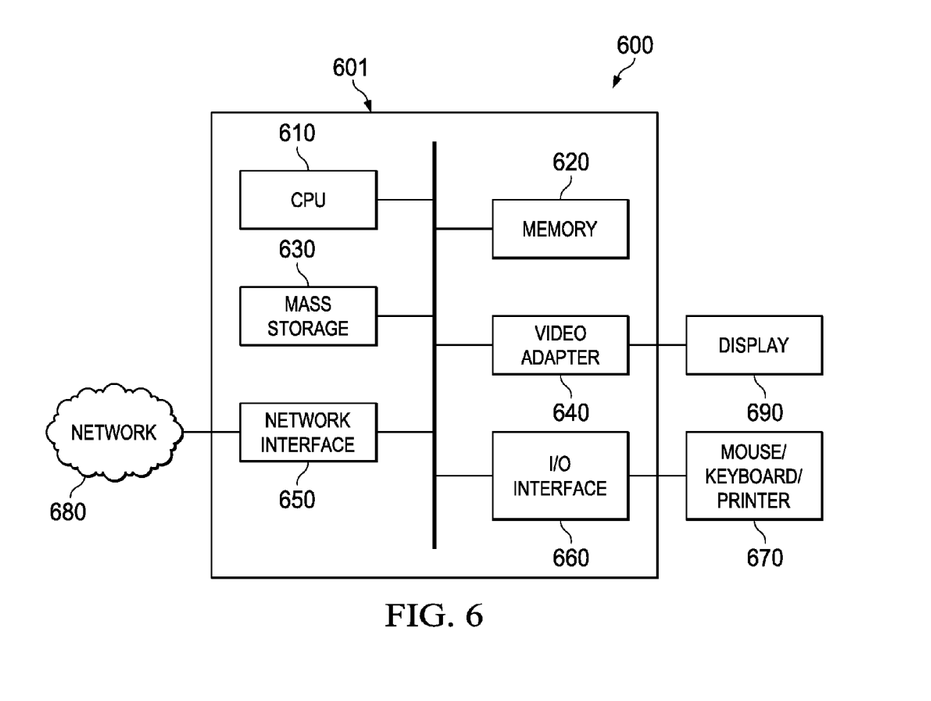
FIG. 6 is a diagram of a processing system that can be used to implement various embodiments.

FIG. 6 is a block diagram of a processing system 600 that can be used to implement various embodiments. The processing system 600 can be part of a CD or other network device. Specific devices utilize all of the components shown, or only a subset of the components, and levels of integration will vary from device to device. Furthermore, a device may contain multiple instances of a component, such as multiple processing units, processors, memories, transmitters, receivers, etc. In some embodiments, the processing system 600 has a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage device 630 includes any type of storage device that stores data, programs, and other information and to make the data, programs, and other information accessible via the bus. The mass storage device 630 includes, for example, one or more of a solid state drive, hard disk drive, a magnetic disk drive, an optical disk drive, or the like.

The video adapter 640 and the I/O interface 660 provide interfaces to couple external input and output devices to the processing unit. As illustrated, examples of input and output devices include a display 690 coupled to the video adapter 640 and any combination of mouse/keyboard/printer 670 coupled to the I/O interface 660. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which includes wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

An embodiment method for performing carrier sense multiple access with collision avoidance (CSMA-CA) by a station in a wireless communications network includes determining, in accordance with transmission information related to previous transmission attempts, a rate of success for each window section of a plurality of window sections, selecting a window section in accordance with at least the rate of success for each of the window sections and at least one predetermined threshold, and transmitting data after a back-off delay selected from within the selected window section. In some embodiments, the selecting the window section comprises selecting a window section of the plurality of window sections having a highest rate of success. The method may further comprise determining the back-off delay by randomly selecting a time within the selected window section. In some embodiments, the determining at least the rate of success for each of the window sections includes determining, from the transmission information and for each window section of the plurality of window sections, the rate of success from a ratio of a first number of transmissions with collisions and a second number of successful transmissions during the previous transmission attempts having first back-off times within limits of the respective window section. In some embodiments, the at least one predetermined threshold includes a first threshold and a second threshold, and selecting the window section includes selecting a first window section of the plurality of window sections in response to the rate of success for a second window section of the plurality of window sections exceeding the first threshold. In some embodiments, the at least one predetermined threshold includes a first threshold and a second threshold, and selecting the window section includes selecting a first window section of the plurality of window sections in response to the rate of success for a second window section of the plurality of window sections being less than or equal to the first threshold and a rate of success for the first window section of the plurality of window sections being less than or equal to the second threshold. In some embodiments, the at least one predetermined threshold includes a first threshold and a second threshold, and selecting the window section includes selecting a first window section of the plurality of window sections in response to the rate of success of the first window section being greater than a rate of success of a second window section of the plurality of window sections and greater than or equal to a second threshold, and the rate of success for the second window section being less than or equal to the first threshold. The method may further include generating a new transmission information entry indicating a result of the transmitting, and updating the transmission information with the new transmission information entry. The updating the transmission information, in some embodiments, includes removing, from the transmission information, an oldest transmission information entry and maintaining a fixed number of transmission information entries. In some embodiments, the method further includes generating the transmission information from attempts to access a medium designated for transmitting data.

An embodiment communications device supporting carrier sense multiple access with collision avoidance (CSMA-CA) includes at least one processor; and a non-transitory computer readable storage medium connected to the at least one processor and storing programming for execution by the at least one processor. The programming includes instructions to determine, in accordance with transmission information regarding previous attempts of accessing a medium designated for transmitting data, a rate of success for each window section of a plurality of window sections, select, from the plurality of window sections, a window section in accordance with at least the rate of success for each of the window sections and at least one predetermined threshold, and transmit data after a back-off delay determined according to the selected window section. In some embodiments, the instructions to determine, in accordance with the transmission information, a rate of success and include instructions to collect a portion of the transmission information using a clear channel assessment (CCA) procedure. In some embodiments, the programming further includes instructions to generate the back-off delay by randomly selecting a time within the selected window section. In some embodiments, the instructions to determine a rate of success include instructions to generate a new transmission information entry indicating a result of the transmitting the data and update the transmission information with the new transmission information entry. In some embodiments, the instructions to determine at least the rate of success for each of the window sections include instructions to determine, from the transmission information and for each of the window sections, the rate of success from a ratio of a first number of transmissions with collisions and a second number of transmissions avoiding collisions during the previous attempts of accessing the medium having first back-off times within limits of the respective window section. In some embodiments, the at least one predetermined threshold includes a first threshold and a second threshold, and the instructions to select the window section include instructions to select a first window section of the plurality of window sections in response to the rate of success for a second window section of the plurality of window sections exceeding the first threshold. In some embodiments, the programming further comprises instructions to determine, in accordance with transmission information regarding previous attempts of accessing a medium designated for transmitting data, a rate of failure for at least one window section of a plurality of window sections, and the instructions to select a window section comprise instructions to select, from the plurality of window sections, a window section in accordance with at least the rate of success for each of the window sections, the rate of failure for the at least one window section, and at least one predetermined threshold. In some embodiments, the at least one predetermined threshold includes a first threshold and a second threshold, and the instructions to select the window section include instructions to select a first window section of the plurality of window sections in response to the rate of success for a second window section of the plurality of window sections being less than or equal to the first threshold and to a rate of failure for the first window section exceeding the second threshold. In some embodiments, the at least one predetermined threshold includes a first threshold and a second threshold, and the instructions to select the window section include instructions to select one of a first window section and a second window section of the plurality of window sections having the highest rate of success, and in response to the rate of success for the second window section being less than or equal to the first threshold and the rate of failure for the first window section being less than or equal to the second threshold. In some embodiments, the instructions to transmit the data including instructions to transmit data after the back-off delay using unscheduled communications signaling.

Although several embodiments have been provided, it should be understood that the disclosed systems and methods might be embodied in many other specific forms without departing from the spirit or scope of the presented embodiments. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present embodiments. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for performing carrier sense multiple access with collision avoidance (CSMA-CA) by a station in a wireless communications network, the method comprising:
    determining, in accordance with transmission information related to previous transmission attempts, a rate of success for each window section of a plurality of window sections;
    selecting a window section in accordance with at least the rate of success for each of the window sections and at least one predetermined threshold; and
    transmitting data after a back-off delay selected from within the selected window section.

2. The method of claim 1, wherein the selecting the window section comprises selecting a window section of the plurality of window sections having a highest rate of success.

3. The method of claim 2, further comprising determining the back-off delay by randomly selecting a time within the selected window section.

4. The method of claim 1, the determining at least the rate of success for each of the window sections comprising:
    determining, from the transmission information and for each window section of the plurality of window sections, the rate of success from a ratio of a first number of transmissions with collisions and a second number of successful transmissions during the previous transmission attempts having first back-off times within limits of the respective window section.

5. The method of claim 1, the at least one predetermined threshold including a first threshold and a second threshold; and
    wherein selecting the window section comprises selecting a first window section of the plurality of window sections in response to the rate of success for a second window section of the plurality of window sections exceeding the first threshold.

6. The method of claim 1, the at least one predetermined threshold including a first threshold and a second threshold; and
    wherein selecting the window section comprises selecting a first window section of the plurality of window sections in response to the rate of success for a second window section of the plurality of window sections being less than or equal to the first threshold and a rate of success for the first window section of the plurality of window sections being less than or equal to the second threshold.

7. The method of claim 1, the at least one predetermined threshold including a first threshold and a second threshold; and
    wherein selecting the window section comprises selecting a first window section of the plurality of window sections in response to the rate of success of the first window section being greater than a rate of success of a second window section of the plurality of window sections and greater than or equal to a second threshold, and the rate of success for the second window section being less than or equal to the first threshold.

8. The method of claim 1, further comprising:
generating a new transmission information entry indicating a result of the transmitting; and
updating the transmission information with the new transmission information entry.

9. The method of claim 8, the updating the transmission information comprising removing, from the transmission information, an oldest transmission information entry and maintaining a fixed number of transmission information entries.

10. The method of claim 1, further comprising generating the transmission information from attempts to access a medium designated for transmitting data.

11. The method of claim 1, the selecting comprising selecting the window section in accordance with comparing the rate of success for at least one of the window sections and one of the at least one predetermined threshold.

12. A communications device supporting carrier sense multiple access with collision avoidance (CSMA-CA), the communications device comprising:
at least one processor; and
a non-transitory computer readable storage medium connected to the at least one processor and storing programming for execution by the at least one processor, the programming including instructions to:
determine, in accordance with transmission information regarding previous attempts of accessing a medium designated for transmitting data, a rate of success for each window section of a plurality of window sections;
select, from the plurality of window sections, a window section in accordance with at least the rate of success for each of the window sections and at least one predetermined threshold; and
transmit data after a back-off delay determined according to the selected window section.

13. The communications device of claim 12, wherein the instructions to determine, in accordance with the transmission information, a rate of success include instructions to collect a portion of the transmission information using a clear channel assessment (CCA) procedure.

14. The communications device of claim 12, wherein the instructions to determine a rate of success comprise instructions to:
generate a new transmission information entry indicating a result of the transmitting the data; and
update the transmission information with the new transmission information entry.

15. The communications device of claim 12, wherein the programming further includes instructions to generate the back-off delay by randomly selecting a time within the selected window section.

16. The communications device of claim 12, wherein the instructions to determine at least the rate of success for each of the window sections include instructions to determine, from the transmission information and for each of the window sections, the rate of success from a ratio of a first number of transmissions with collisions and a second number of transmissions avoiding collisions during the previous attempts of accessing the medium having first back-off times within limits of the respective window section.

17. The communications device of claim 12, the at least one predetermined threshold including a first threshold and a second threshold; and
wherein the instructions to select the window section include instructions to select a first window section of the plurality of window sections in response to the rate of success for a second window section of the plurality of window sections exceeding the first threshold.

18. The communications device of claim 12, wherein the programming further comprises instructions to determine, in accordance with transmission information regarding previous attempts of accessing a medium designated for transmitting data, a rate of failure for at least one window section of a plurality of window sections; and
wherein the instructions to select a window section comprise instructions to select, from the plurality of window sections, a window section in accordance with at least the rate of success for each of the window sections, the rate of failure for the at least one window section, and at least one predetermined threshold.

19. The communications device of claim 18, the at least one predetermined threshold including a first threshold and a second threshold; and
wherein the instructions to select the window section include instructions to select a first window section of the plurality of window sections in response to the rate of success for a second window section of the plurality of window sections being less than or equal to the first threshold and a rate of failure for the first window section exceeding the second threshold.

20. The communications device of claim 18, the at least one predetermined threshold including a first threshold and a second threshold; and
wherein the instructions to select the window section include instructions to select one of a first window section and a second window section of the plurality of window sections having the highest rate of success in response to the rate of success for the second window section being less than or equal to the first threshold and the rate of failure for the first window section being less than or equal to the second threshold.

21. The communications device of claim 12, the instructions to transmit the data including instructions to transmit data after the back-off delay using unscheduled communications signaling.

* * * * *